Feb. 2, 1943.   J. Q. HOLMES ET AL   2,310,083
APPARATUS FOR FORMING SIDE OPENINGS IN METAL TUBING
Filed May 28, 1941   8 Sheets-Sheet 1

INVENTORS
John Q. Holmes and
Carl J. Wiegand
BY
Spencer Hardman & Fehr
their ATTORNEYS Feb. 2, 1943.  J. Q. HOLMES ET AL  2,310,083
APPARATUS FOR FORMING SIDE OPENINGS IN METAL TUBING
Filed May 28, 1941  8 Sheets-Sheet 2

INVENTORS
John Q. Holmes
Carl J. Wiegand
by
Spencer Hardman & Fehr
their ATTORNEYs

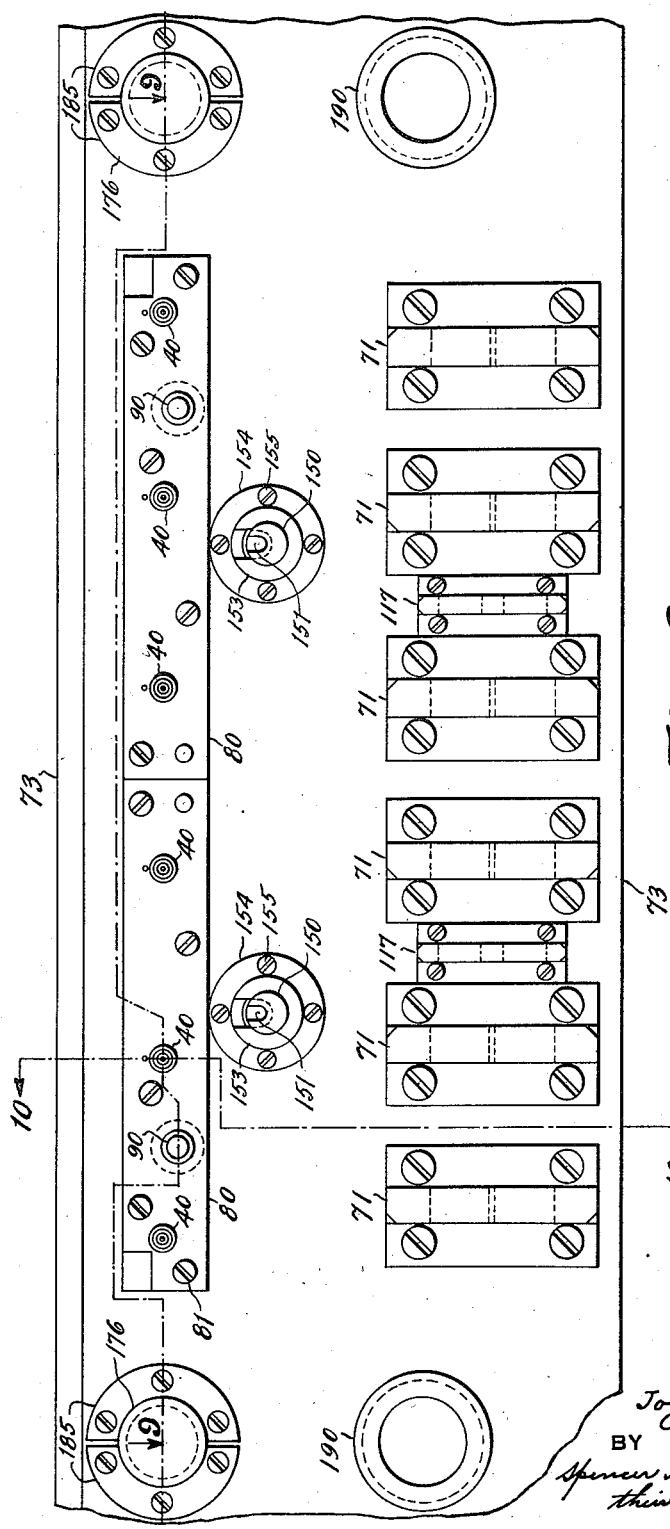

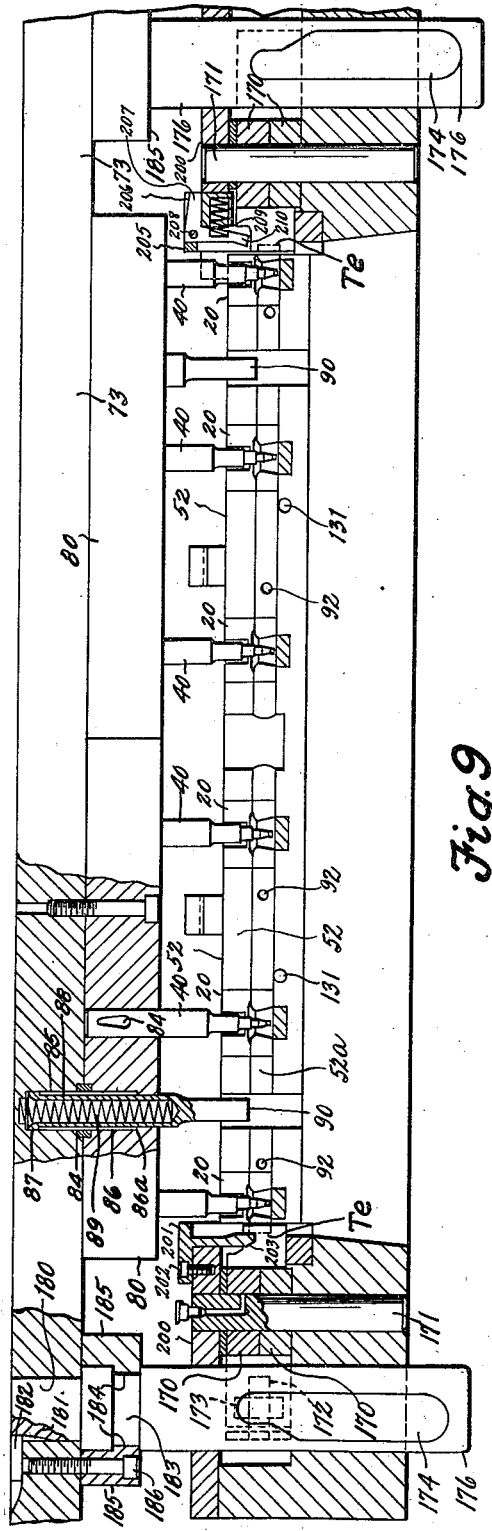
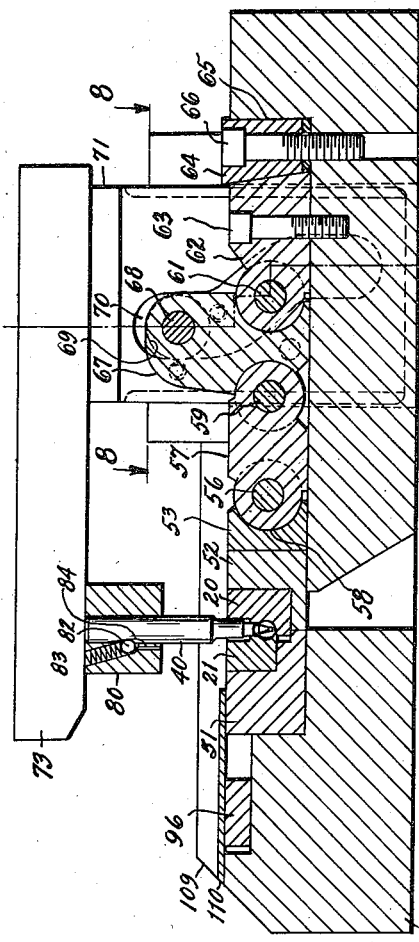
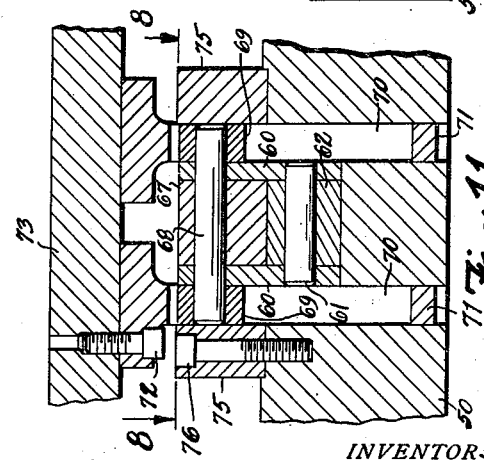

Feb. 2, 1943.   J. Q. HOLMES ET AL   2,310,083
APPARATUS FOR FORMING SIDE OPENINGS IN METAL TUBING
Filed May 28, 1941    8 Sheets-Sheet 5

INVENTORS
John Q. Holmes and Carl J. Wiegand
BY
Spencer Hardman & Fehr
their ATTORNEYS Feb. 2, 1943. J. Q. HOLMES ET AL 2,310,083
APPARATUS FOR FORMING SIDE OPENINGS IN METAL TUBING
Filed May 28, 1941 8 Sheets-Sheet 8

INVENTORS
John Q. Holmes & Carl J. Wiegand
BY
Spencer Hardman & Fehr
their ATTORNEYS Patented Feb. 2, 1943

2,310,083

UNITED STATES PATENT OFFICE 2,310,083

APPARATUS FOR FORMING SIDE OPENINGS IN METAL TUBING

John Q. Holmes and Carl J. Wiegand, Anderson, Ind., assignors to General Motors Corporation, Detroit, Mich., a corporation of Delaware Application May 28, 1941, Serial No. 395,650

6 Claims. (Cl. 153—2)

This invention relates to the fabrication of articles made of metal tubing, for example, the oil distributing manifold for the crank shaft bearings of an internal combustion engine.

The copending application of Charles A. Nichols and George L. Weiser, Serial No. 385,518, filed March 27, 1941, discloses a method of manufacturing a T from metal tubing. The first step of the method is to squeeze a portion of one of the tubes between dies which are so shaped that a portion of the side wall of the tube is pinched or creased to provide a portion which has an exterior surface which is spherically convex. The next step is to force a punch through the spherically convex portion of the tubing while the tubing remains confined between the shaping blocks. The punch is made of hardened metal and is carefully polished and chrome-plated. Its tapered lower end enters the spherical surface and punches out a hole. While the tubing is confined between the forming blocks this spherical surface is maintained so rigid as to withstand the punching without pushing the metal of the spherical portion inwardly. When a hole is started in this spherical portion the tapered part of the punch flares the hole in such fashion as to form an annular flange extending outwardly, thus defining a socket for the reception of another piece of tubing.

The present invention has for its object the provision of a machine by which the method disclosed in the Nichols and Weiser application may be practiced with great facility. More particularly it is an object of the invention to provide a machine for forming a plurality of side openings in a length of tube.

A further object of the invention is to provide means for closing one or both ends of the tube concurrently with the formation of the side openings.

A further object of the invention is to provide for automatically feeding lengths of tubing from a magazine to the forming dies and for automatically ejecting the tubing after it has been operated upon.

Further objects and advantages of the present invention will be apparent from the following description, reference being had to the accompanying drawings wherein a preferred embodiment of the invention is clearly shown.

In the drawings:

Fig. 1 is a side elevation of one of the tube forming die blocks shown in Fig. 2. Fig. 1 is a view in the direction of arrow 1 of Fig. 2.

Fig. 2 is a cross sectional view of the two die blocks when separated and before engaging a tube. Fig. 2 is a sectional view on the line 2—2 of Fig. 1. Fig. 2 includes also a fragmentary side view of the piercing punch.

Fig. 3 is a sectional view on the line 2—2 of Fig. 1.

Fig. 8a is a plan view of the upper die assembly, this figure being viewed from the underside.

Fig. 9 is a sectional view of the upper and lower die members, taken principally on the line 9—9 of Figs. 8 and 8a.

Fig. 10 is a sectional view on the line 10—10 of Fig. 8.

Fig. 11 is a sectional view on line 11—11 of Fig. 10.

Figure 1:
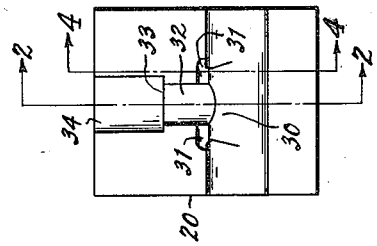
Figure 2:
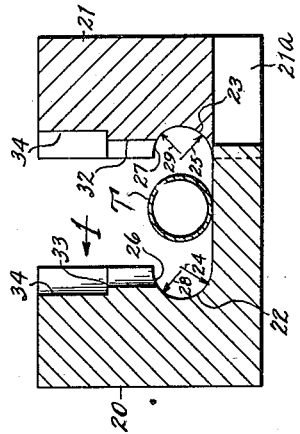

Referring to Fig. 2, the tube T is located between die blocks 20 and 21 providing semi-cylindrical surfaces 22 and 23 having radii equal to the radii of the outside surface of the tube T as indicated by the arrows 24 and 25. The surfaces 22 and 23 merge into cylindrical surfaces 26 and 27 having radii represented by the arrows 28 and 29 which are less than the radii 24 and 25. The surface of block 20 (Fig. 1) having the radius 28 as indicated by numeral 30 in Fig. 1. Just above the surface 30 there is a shallow groove 31 interrupted by a semi-cylindrical groove 32. Groove 32 extends to a step 33 which steps off to a semi-cylindrical groove 34 of greater radius than groove 32. The block 21 is provided with similar surfaces 32, 33 and 34. Block 20 includes parts 20a engaging grooves 21a of part 21.

When the dies 20 and 21 are separated as shown in Fig. 2, a section of tubing T is placed upon the parts 20a. Then the dies 20 and 21 are moved together to cause the tube to take the form shown in Fig. 3. The portions 26 and 27 of the dies 20 and 21 deform the tube T and cause a spherically convex portion Ts to be formed. This portion in effect rises up like a blister within the space defined by the two cylindrical grooves 32. The portions of the tube immediately adjacent to and on diametrically opposite sides of the portion Ts are formed as shown in Fig. 4 by the surface defining the grooves 31. These pinched portions of the tube T are marked Tp.

While the tube T is thus confined between the dies 20 and 21, the second operation is performed. This comprises forcing the punch 40 downwardly through the opening defined by the cylindrical grooves 34 and 32. Punch 40 has a lower end portion 41 for piercing a hole in the blister-like spherical part Ts and a tapered portion 42 for spreading the metal surrounding the hole formed by portion 41 and for causing the spread metal to form an upwardly extending annular flange Tf shown in Fig. 5, said flange being trued by portion 43 of punch 40.

The operating surface of punch 40 should be carefully polished and chrome-plated in order to secure best results.

Figure 7:
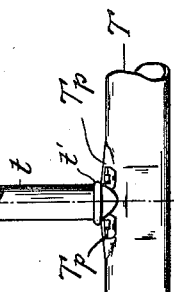
Fig. 7 is a side view in the direction of arrow 7 of Fig. 6.
Figure 6:
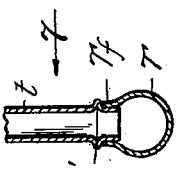
Fig. 6 is a sectional view on the line 6—6 of Fig. 7 showing the piece of tubing shown in Fig. 5 assembled with another piece of tubing extending at right angles to the first piece.

Following the operations performed by the dies 20 and 21 and the punch 40, the tube T is ready to receive a branch connection t of such diameter as to be snugly received within the socket provided by the annular flange Tf. The tube section t has an annular flange t' for engaging the outer edge surface of the flange Tf. After the assembly shown in Fig. 6 has been made, the portions Tp of tube T are deformed so as to squeeze the flange Tf more firmly around the tube t. The apparatus for performing the operation shown in Fig. 7 is disclosed in Serial No. 385,518.

The apparatus which forms the subject matter of the present application provides a length of tubing with a plurality of side openings, each opening being formed according to the method disclosed in Figs. 2, 3, 4 and 5. The dies 20 and 21 which are used with the apparatus are the same as the dies shown in Figs. 1 to 5, excepting that the parts 20a and 21a are omitted. Parts 20a are replaced by retractable pins 131 shown in Fig. 15.

Figure 13:
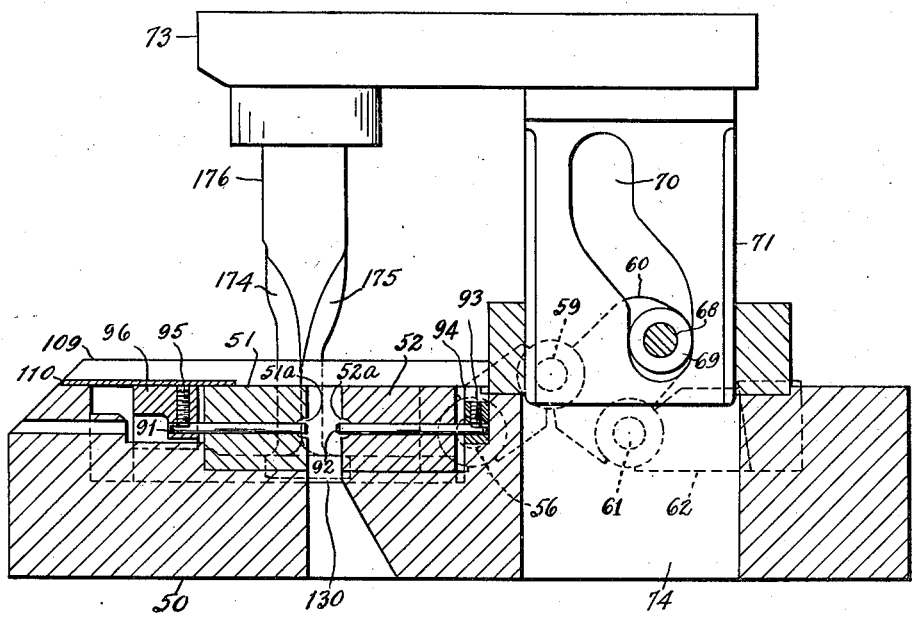
Fig. 13 is a view similar to Fig. 12 with the upper member in upper position.
Figure 12:
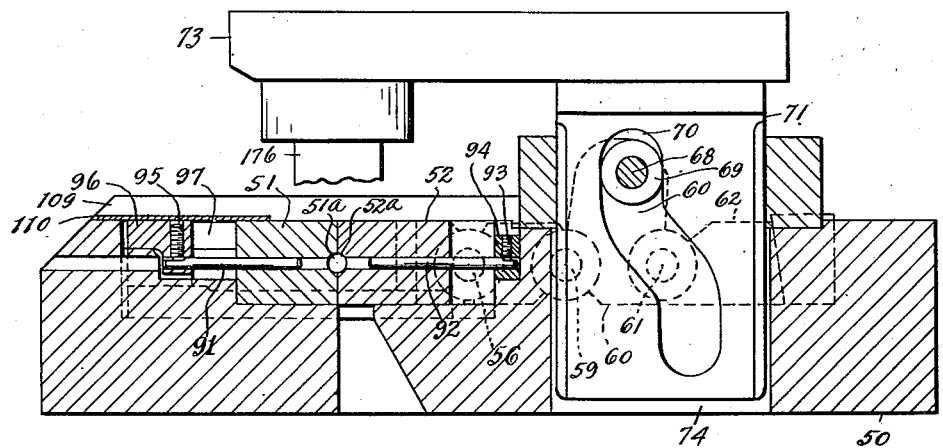
Fig. 12 is a sectional view on line 12—12 of Fig. 8 with the upper member in lower position.

Referring to Figs. 12 and 13, it will be seen that the machine comprises a lower assembly and an upper assembly. The lower assembly includes a base 50 adapted to be mounted upon the bed of a punch press. Base 50 supports a stationary bar 51 and a movable bar 52 grooved at 51a and 52a, respectively, to receive a length of tubing T in Fig. 2. Bar 51 carries a plurality of spaced dies 21 cooperating with the dies 20 carried by the bar 52 (Fig. 10). The bar 52 is movable horizontally relative to bar 51 by a cam operated toggle mechanism which will now be described with reference to Fig. 10 and Fig. 8.

Bar 52 is recessed to receive a plurality of blocks 53 attached by screws 54. Each block 53 is provided with two spaced ears 55 supporting a pin 56 passing through a toggle link 57 and the left end (Fig. 10) of which is formed cylindrically and is received by a cylindrical bearing 58 in block 53. Link 57 is connected by pin 59 with link plates 60 connected by pin 61 with a stationary toggle block 62 attached by screws 63 to base 50. The pressure which is exerted against the block 62 horizontally and to the right in Fig. 10 is transmitted to the base 50 principally through a wedge block 64 having an inclined surface bearing against a similar surface of the block 62 and having a vertical surface bearing against the surface 65 of base 50. Screws 66 secure the wedge block 64 to the base 50 and wedge this block between surface 65 of base 50 and the toggle block 62. The right hand end of link 57 (Fig. 10) and the left hand end of block 62 are formed cylindrically and are received by cylindrical bearings in a toggle link block 67 which is located between the link plates 60. A pin 68 passes through the block 67 and through the link plates 60 as shown in Fig. 11. The projecting ends of the pin 67 carry rollers 69 received by cam slots 70 in cam plates 71 which are attached by screws 72 to an upper block 73 adapted to be secured to the ram of a punch press. This block 73 and the parts carried thereby constitute the upper assembly of the apparatus. As shown in Fig. 8a there are six cam plates 71 which operate in three pairs. Each pair of plates 71 is associated with a toggle mechanism such as shown in Figs. 10 and 11. Each plate 71 passes through an opening 74 in base 50 and is supported laterally on one side by the toggle mechanism and on the other side by a plate 75 secured to base 50 by screws 76. When the block 73 is in its lower-most position shown in Fig. 10, the cam 71 will be located so that the toggle pins 56, 59 and 61 will be in horizontal alignment, thereby causing the bar 52 carrying the dies 20 to be located as shown in Fig. 10 but closest to the dies 21 to perform the operation shown in Figs. 3 and 4. When the block 73 is in the uppermost position as shown in Fig. 13 the toggle pin 59 will be elevated above the pins 56 and 61, thereby causing the bar 51 to be moved toward the right so as to separate all of the dies 20 from the dies 21.

Figure 3:
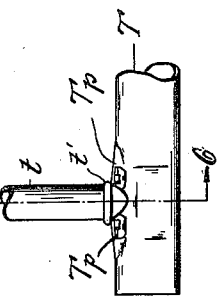
Fig. 3 is a view similar to Fig. 2 showing the shaping of the tube by the forming die blocks.
Figure 5:
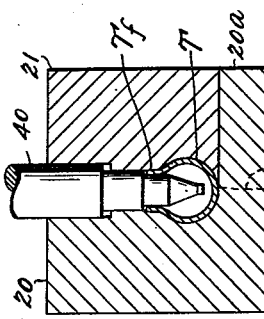
Fig. 5 is a view similar to Fig. 3 showing the piercing and flange flaring punch in downward position.
Figure 4:
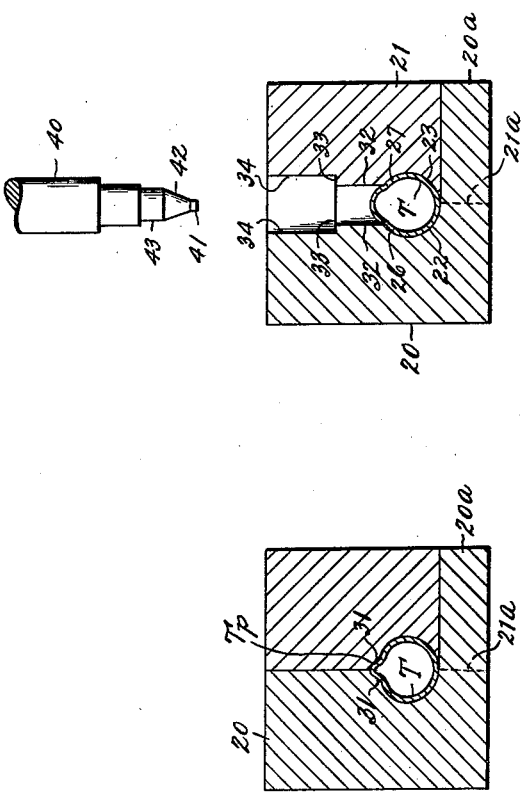
Fig. 4 is a cross sectional view taken on the line 4—4 of Fig. 1 showing the formation of the tubing adjacent to and on both sides of the spherical convex portion of the tube as shown in Fig. 3.

Downward movement of the block 73 causes each of a plurality of punches 40 to be moved from the position shown in Fig. 3 to that shown in Figs. 5 and 10 in order to perform the operations of piercing the spherically convex portion Ts of Fig. 3 to form a side opening surrounded by flange Tf as shown in Fig. 5. The cam slots 70 are so shaped that the spherical portion Ts of Fig. 3 will be formed in advance of contact thereof by the lower end of punch 40. Each punch 40 is received by a vertical hole in a bar 80 secured by screws 81 to plate 73. As shown in Fig. 8a there are two bars 80 each carrying three punches 40. Each punch 40 is maintained in its socket provided by bar 80 by a ball 82 urged by spring 83 into a groove 84 provided in the punch. The pressure exerted by the ball 82 is sufficient to retain the punch 40; but the punch 40 may be easily removed from its supporting bar 80 by pulling downwardly on the punch 40 when the plate 73 is in uppermost position.

Each bar 80 is located with respect to the plate 73 by a dowel washer 84, the inner cylindrical bore of which is aligned with a bore 85 in plate 73 in a bore 86 in bar 80. The bores 85 and 86 together with the uniting bore of the washer 84 provides for the guidance of a flange 87 integral with a tube 88 receiving a spring 89. The tube 88 is integral with a pressure pad 90 which is urged by the spring 89 against the tube T which is located in the grooves 51a and 52a of the bars 51 and 52 respectively, when the plate 73 is in lowermost position. When the plate 53 is moved upwardly the lower end of the pressure pad 90 will be elevated above the tubing receiving grooves 51a and 52a by virtue of the engagement of the flange 87 with the shoulder 86a at the lower end of the bore 86 of bar 80 as shown in Figs. 9 and 15.

After the operation shown in Figs. 3, 4 and 5 have been performed upon the tubing and it is ejected from the dies 20 and 21 and the bars 52 and 51 due to the relative movement between the bars 51 and 52 and a plurality of ejector pins 91 and 92 (Figs. 12 and 13). The bar 52 moves relative to the pins 92 as shown when comparing Figs. 12 and 13. Pins 92 are stationary and are secured by screws 93 to a bar 94 carried by base 50. When the bar 52 moves to the right from the position shown in Fig. 12 to that shown in Fig. 13, the ends of rods 92 project into the grooves 52a. During movement of bar 52 toward the right, rods 91 move from the position shown in Fig. 12 to that shown in Fig. 13 so that their ends project into the grooves 51a of bar 51. To accomplish this the pins 91 are attached by screws 95 to a bar 96 connected at its ends with the ends of bar 52 by straps 97 (Fig. 12) attached by screws 98 and dowels 99 (Fig. 8).

Figure 8:
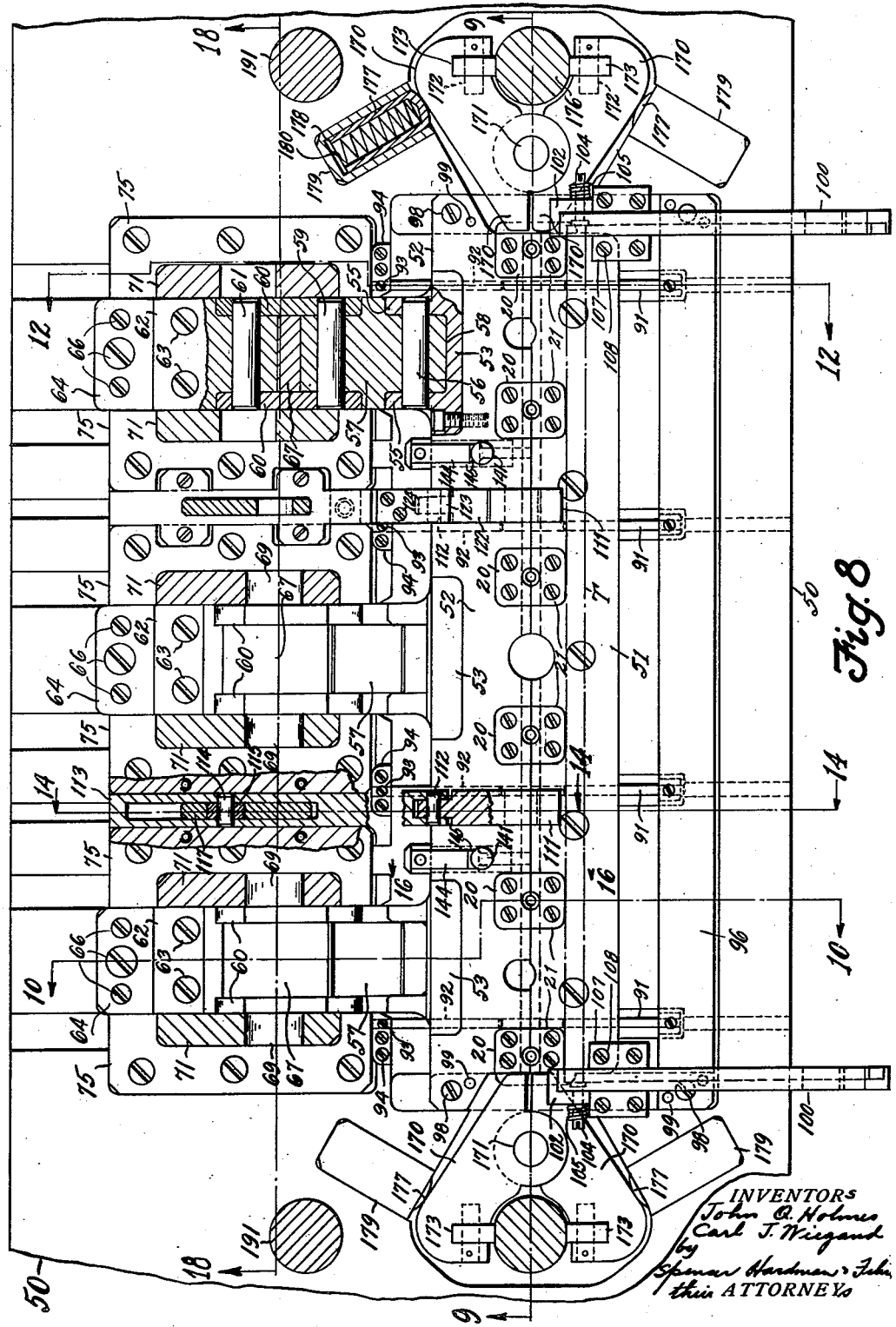
Fig. 8 is a plan view of the lower die assembly and operating mechanism, certain parts being shown in section on the lines 8—8 of Figs. 10, 11 and 15.
Figure 15:
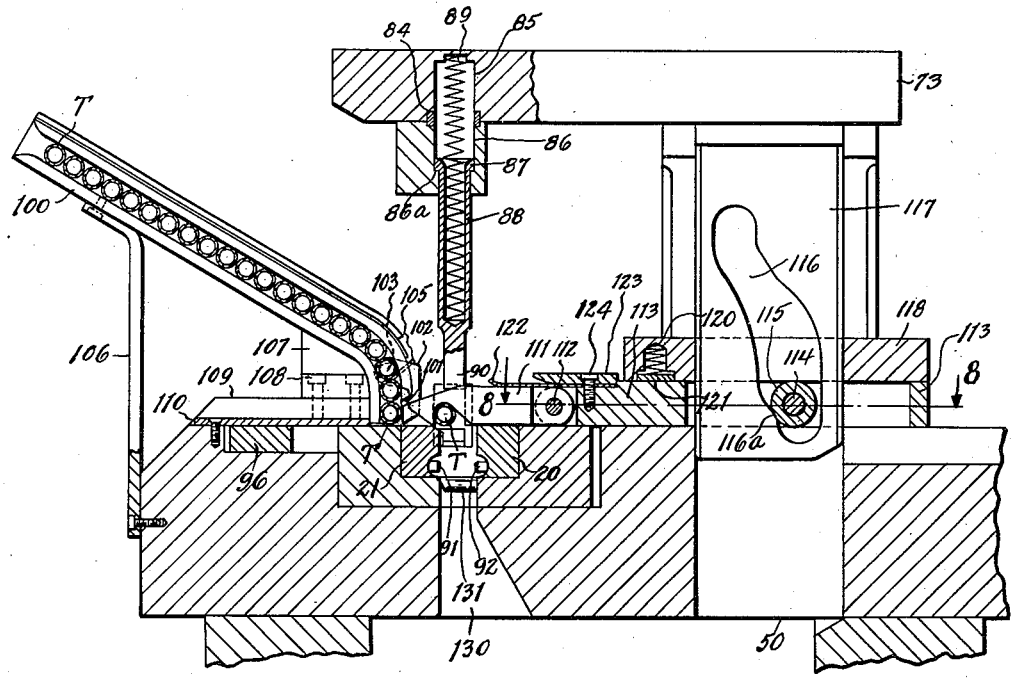
Fig. 15 is a view similar to Fig. 14 with the upper member in upper position.
Figure 14:
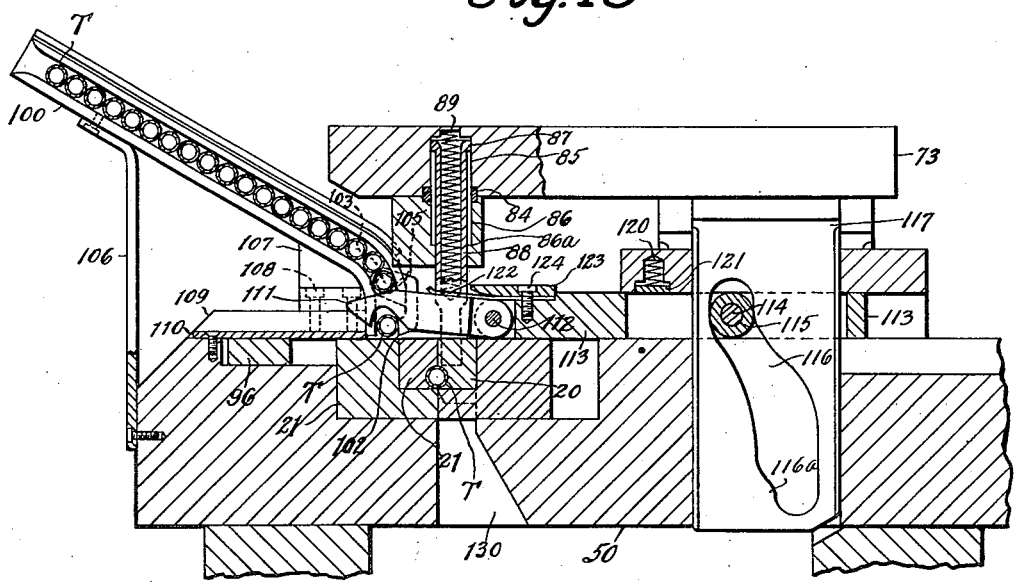
Fig. 14 is a sectional view on line 14—14 of Fig. 8 and shows the upper member in lower position.

Referring to Figs. 8, 14 and 15 it will be seen that the lengths of tubing T to be operated upon are stacked in a magazine comprising two chutes 100 each providing a downwardly inclined channel for receiving end portions of the tubes T. This channel bends near the lower end of the chute into a vertical portion having an outlet 101 formed in one of the flanges of the chute. The movement of the lowermost tube T through the outlet 101 is resisted by pawls 102, each of which engages a tube near one end thereof. Each pawl 102 is pivoted at 103 upon a pin 104 (Fig. 8) extending from the chute; and a coil spring 105 surrounding the pin urges the pawl 102 in a clockwise direction in Figs. 14 and 15. In Fig. 8 the lowermost tube T is indicated in dot-dash lines. Each chute 100 is supported by a bracket 106 and a block 107 attached by screws 108 to the flange 109 of a plate 110 located over the bar 96 which carries the ejector pins 91. For the sake of clearness this plate 110 is not shown in Fig. 8.

The lowermost tube T is withdrawn from the magazine by two fingers 111 (Figs. 14 and 15) each connected by pin 112 with a slide bar 113 carrying a pin 114 providing a bearing for a roller 115 cooperating with a cam slot 116 in a cam plate 117 attached to plate 73. Bar 113 slides between the adjacent edges of the block 75 which guide the cam 71 (Fig. 8). The bar 113 is confined between the base 50 and a plate 118 secured to the base by screws 119. Plate 118 provides an opening for the passage of the cam plate 117 therethrough. Plate 118 is recessed to receive a spring 120 urging a pressure pad 121 against the upper surface of the bar 113. Each finger 111 is biased downwardly by leaf spring 122 having its fixed end confined between bar 113 and a plate 123 secured to bar 113 by screw 124.

During movement of plate 73 downwardly into a position shown in Fig. 14 the cam plate 117 causes the bar 113 to move toward the left in order that the fingers 111 may hook themselves over the lowermost tubing T then in the magazine as shown in Fig. 14. The movement of the fingers 111 into the position shown in Fig. 14 takes place concurrently with movement of the die 20 toward the die 21 in order to form the tube T then between these dies. During upward movement of plate 73 these dies are separated as shown in Fig. 15 and the ejector pins 91 and 92 cause the tubing T which has just been operated upon to be removed from the dies in the die plates 51 and 52 and to descend through an opening 130 into a suitable hopper. During the upward movement of plate 73 for the purpose of opening the dies and effecting the ejection of the work, the tube T, which in Fig. 14 was the lowermost one in the magazine, has been moved by the hook fingers 111 into the position shown in Fig. 15 from which position it may gravitate between the dies 20 and 21. In order that this tube T will not then descend through the opening 130, two stop pins 131 are released and are caused by spring action to move across the opening 130 to block the descent of the tube which has just been moved by the fingers 111 into the position shown in Fig. 15. The stop pins 131 are so controlled that they are maintained in a retracted position during upward movement of the plates 73 for a time sufficient to permit gravitation from the dies of the length of tubing T which has been operated upon. However, before the fingers 111 have arrived at the position as shown in Fig. 15, the fingers 131 have been released so that they become operative to prevent the tubing T, which has just been retracted by the fingers 111 from descending below the dies 20 and 21.

Figure 16:
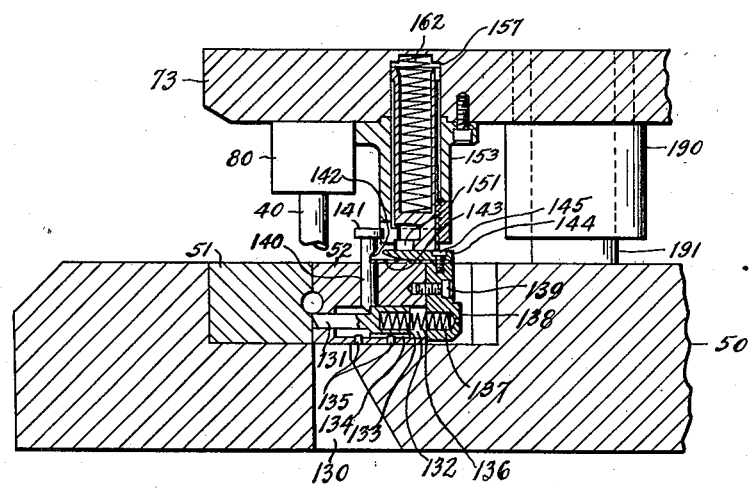
Fig. 16 is a sectional view on line 16—16 of Fig. 8 with the upper member in lower position.
Figure 19:
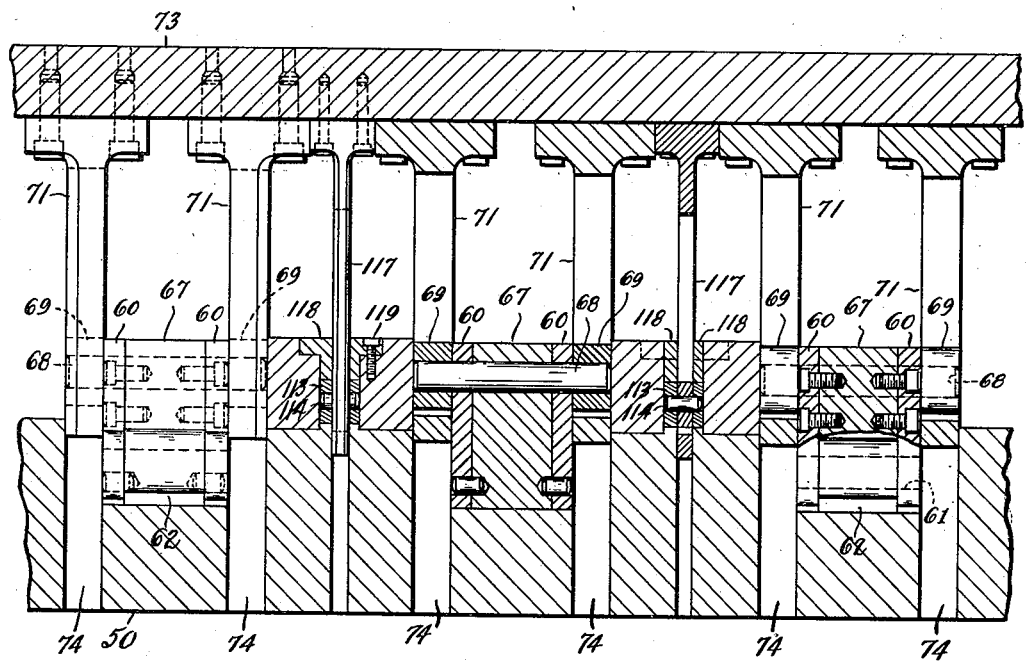
Fig. 19 is a view similar to Fig. 18 showing the upper member in upper position.
Figure 18:
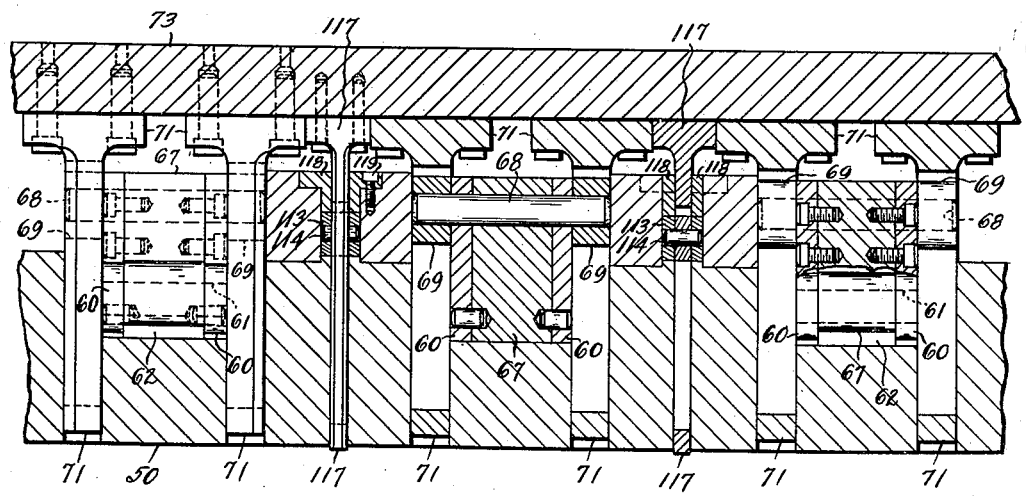
Fig. 18 is a sectional view on line 18—18 of Fig. 8 showing the upper member in lower position.

The mechanism for controlling the stop pins 131 will now be described with reference to Figs. 16 and 17. Each finger 131 is horizontally slidable in die block 52 which is provided with a bore 132 for receiving the tubular head 133 of the pin 131. Head 133 is provided with a longitudinal groove 134 for receiving one or the other of two pins 135 mounted in the block 52 and extending into the bore 132. The pin 131 is urged toward the left by a spring 136 confined within the bore in the head 133 and in a bore 137 of a block 138 secured by screws 139 to bar 52. When the die bar 52 has moved into contact with the bar 51 as shown in Fig. 16, the pin 131 occupies a position relative to the bar 52 such that its head 133 is caught by the lower end of a latch pin 140 provided with a head 141 and with a notch 142 for receiving a leaf spring 143 biased to urge the pin 140 downwardly into the position shown in Fig. 16. Spring 143 is confined between the bar 52 and the block 138 on its lower side and a plate 144 on its upper side. Plate 144 is secured together with the spring 143 by a screw 145 to the block 138.

In order that each pin 131 may be released at a time preceding the arrival of a tube T withdrawn from the magazine at the position shown in Fig. 15 just above the opening between the dies, each of the latch pins 141 must be elevated. Upward movement of pins 141 from the position shown in Fig. 16 to that shown in Fig. 17 is effected by a lifter 150 of generally tubular formation and provided with a flange 151 which is notched to receive the shank portion of the pin 140 and which is spaced from the bottom or closed end of the tube 150 to provide a notch 152 for receiving the head 141 of the pin 140. The lifter tube 150 is supported by a bushing 153 having a flange 154 through which pass screws 155 for securing the bushing 153 to the plate 73. The central bore 156 of the bushing 153 aligns with a bore 157 in the plate 73. These aligned bores provide a cylindrical guide for the annular flange 158 extending from the tube 150. The portion of the tube 150 below the flange 158 is guided by a bore 159 of the bushing 153, said bore being of smaller diameter than the bore 156. Rotation of the tube 150 is prevented by a key 160 attached to the bushing 153 and received by longitudinal groove 161 in the lifter tube 150. A spring 162 within the tube and the bores 156 and 157 urges the tube 150 downwardly until its flange 158 is caught by a shoulder 163 joining the bore 159 of smaller diameter with the bore 156 of larger diameter.

When the plate 73 is in its lowermost position, the lifter tube 150 is almost completely telescoped within the bushing 153 and the plate 73, and the spring 162 is fully compressed. As the plate 73 ascends, the spring 162 is permitted to expand so that the lower flange 151 of the lifter 150 will remain yieldingly pressed against the plate 144. As the plate 73 moves upwardly the die bar 52 moves toward the right from the position shown in Fig. 16, but the pin 140 remains for a time in latching position so that the pins 131 cannot be released so as to extend to the left of the bar 52. During movement of the bar 52 toward the right, the heads 141 of the pins 140 are received by the notches 152 of the lifters 150. The cams 71 are so shaped that, before the plate 73 has reached its uppermost position, the die bar 52 will have been fully retracted and the tubing T operated upon ejected from the die and permitted to gravitate through the passage 130. During the latter portion of the ascent of the plate 73 the upper flanges 158 of the lifters 150 will be engaged by the shoulders 163 of the bushings 53 and thereafter the pins 140 will be elevated into the position shown in Fig. 17, thereby releasing the pins 131 so as to permit these springs 136 to cause the pins to extend across the passage 130 just below the die openings and the grooves 51a and 52a of the die bars 51 and 52. The release of the pins 131 and their movement into this position will take place before the roller 115 has been engaged by a cam lobe 116a defining a part of the cam slot 116. After the pins 131 have been projected across the opening 130, the lobe 116a engages the roller 115 and causes an abrupt acceleration in the movement of the notched fingers 111 to take place toward the right, thereby giving the tubing then being withdrawn from the magazine a quick snappy movement which is abruptly stopped, thereby causing the tubing more readily to leave the notch provided by the fingers 111 and to descend into the space between the dies 20 and 21.

During the following downward movement of the plate 73 the lower end of the lifter 150 will be yieldingly pressed against the plate 144, thereby permitting the spring 143 to urge the latch pin 141 downwardly against the head 133 of pin 131. During movement of the bar 52 into contact with the bar 51 the pin 131 remains stationary so that relative movement between the pin 141 and the head 133 of pin 131 takes place. By the time the bar 52 has been placed in contact with the bar 51 (Fig. 16), the lower projecting end of pin 141 will have arrived at the left of the head 133 of pin 131, thereby permitting the spring 143 to move the pin 140 downwardly into its latching position.

The lengths of tubing T are longer than the die bars 52 so that ends thereof project as indicated by dot-dash lines Te in Fig. 9. These end portions may be squeezed or crimped together in order to close the ends of the tube. This operation is performed at each end by the closing of jaws 170 pivoted on a rod 171 and carrying pins 172, supporting rollers 173 cooperating with cam surfaces 174 and 175 (Fig. 13) formed in a rod 176 attached to the plate 73. The rollers 173 are urged against the rod 176 by plungers 177 sliding in bores 178 provided by brackets 179 which together with the plungers house springs 180 for urging the plungers inwardly toward the rod 176. The cams 174 and 175 are so shaped that when the rod 176 is in the uppermost position the jaws 170 will be opened, but will be closed as shown in Fig. 8 when the rods 176 are in lowermost position as shown in Fig. 9.

As the tubes T descend through the chutes 100 they are so guided that their ends project substantially equally from the ends of the die bars 51 and 52. As the plate 73 starts downwardly the pressure pads 90 almost immediately engage the top of the tubing T and force the tube between end-guiding members which will now be described with reference to Fig. 9. Plate 200, which overlies the jaws 170 at the left end of Fig. 9 and is attached to base 50, carries a bracket 201 secured by screw 202 and providing an arm 203 for engaging and guiding the left end Te of tube T. Adjacent the right end Te of tube T, there is located a bracket 205 notched at 206 to receive a lever 207 pivoted on a pin 208 and urged by a spring 209 clockwise. The arm 210 of lever 207 constitutes a right hand guide for engaging the end Te of tube T. Spring 209 has sufficient force to move the tube T endwise to engage the left hand guide 203, in case tube T does not already engage it on being forced downwardly by pressure pads 90. Therefore by the time the jaws 170 start to crimp the ends of the tube, the tube will still remain in position so that the end portions which project beyond the ends of the bars 51 and 52 will remain substantially equal. Therefore the end portion of the tube to be crimped by the jaws 170 will be substantially equal in extent.

As shown at the left hand end of Fig. 9, each rod 176 is provided with a shank 180 received by bore in plate 73 and provided with a key slot 181 received by a key 182 which prevents rotation of the rod 176. Rod 176 is provided with an annular groove 183 receiving arcuate flanges 184 of half washer members 185 attached by screws 186 to plate 73.

Figure 17:
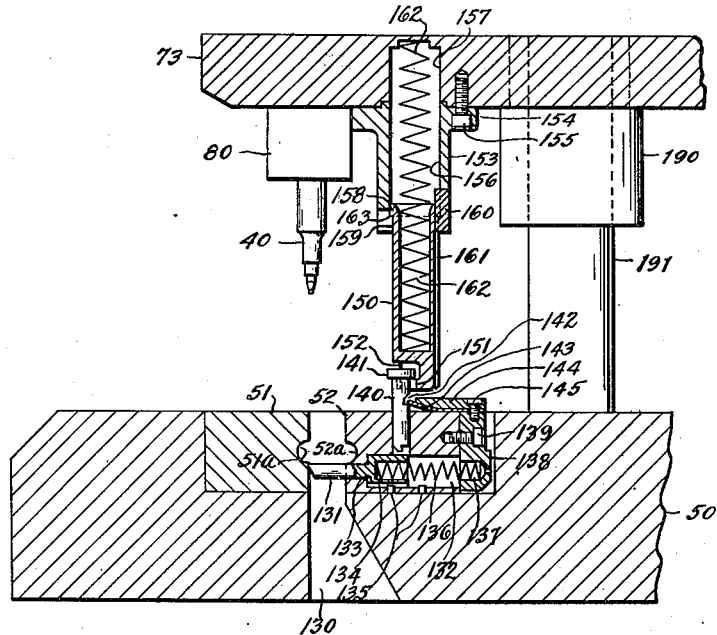
Fig. 17 is a view similar to Fig. 16 showing the upper member in upper position.

The upper plate 73 is provided with pilot bushings 190 each for receiving a pilot rod 191 extending from the base 50 (Figs. 8, 8a and 17).

While the embodiments of the present invention as herein disclosed constitute preferred forms, it is to be understood that other forms might be adopted, all coming within the scope of the claims which follow.

What is claimed is as follows:

1. Apparatus for forming a side opening in a length of metal tubing comprising a pair of relatively movable dies for clamping the tubing and for forming a bulge in a side wall of the tubing, a punch for piercing the bulged portion of the tubing, a reciprocatory member for moving the punch at right angles to the axis of the tubing, and a mechanism operated by the reciprocatory member for effecting relative movement between the dies in a direction at right angles to the axis of the tubing and to the direction of movement of the punch said mechanism maintaining the dies clamped against the tubing while the punch pierces the bulged portion.

2. Apparatus according to claim 1 in which the mechanism for effecting relative movement between the dies includes a cam carried by the reciprocatory member and a toggle mechanism connected with one of the dies.

3. Apparatus according to claim 1 further characterized as having a magazine for holding a quantity of lengths of tubing, and a mechanism for withdrawing a tube from the magazine and causing it to be placed between the dies.

4. Apparatus according to claim 1 further characterized as having a mechanism for pinching together an end portion of the tubing, said mechanism including a cam carried by the reciprocatory member and a pair of jaws for engaging the tubing and providing follower elements engaging the cam.

5. Apparatus for forming a side opening in a length of metal tubing comprising dies for clamping the tubing in a horizontal position and for forming a bulge at the upper side of the tubing, one of the dies being fixed and the other mounted for horizontal movement toward the fixed die, a vertically movable punch for piercing the bulged portion, a vertically movable reciprocatory member for supporting the punch, a mechanism operated by the reciprocatory member for effecting horizontal movement of the movable die, and mechanism advancing the movable die against the tubing and the tubing against the fixed die during downward movement of the punch and ahead of engagement of the punch with the tubing, said mechanism retracting the movable die from the tubing during upward movement of the punch and following retraction of the punch from the tubing and completing retraction of the movable die ahead of completion of the upward movement of the punch, a horizontally movable plunger carried by the movable die below the cavities of the dies and providing a support for the tubing placed between the dies while the dies are separated, a spring urging the plunger toward the fixed die, means for latching the plunger within the movable die when the movable die has advanced against the tubing whereby the formed and pierced tubing may gravitate from the dies when the dies are separated, and means for retracting the latching means from the plunger during upward movement of the punch following complete retraction of the movable die.

6. Apparatus according to claim 5 having a magazine for holding a quantity of lengths of tubing, and means operated by the reciprocatory member, while the dies are separated and the plunger is unlatched and is moved by its spring toward the fixed die, for moving a tube from the magazine to a position where it may gravitate upon the plunger.

JOHN Q. HOLMES.
CARL J. WIEGAND.